US006341369B1

(12) United States Patent
Degenaro et al.

(10) Patent No.: US 6,341,369 B1
(45) Date of Patent: Jan. 22, 2002

(54) METHOD AND DATA PROCESSING SYSTEM FOR SPECIFYING AND APPLYING RULES TO CLASSIFICATION-BASED DECISION POINTS IN AN APPLICATION SYSTEM

(75) Inventors: Louis Ralph Degenaro, White Plains, NY (US); David Lars Ehnebuske, Georgetown; Barbara Jane Alspach McKee, Austin, both of TX (US); Kevin Paul Rasmus, Bloomington, IL (US); Isabelle Marie Catherine Rouvellou, New York City, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,970

(22) Filed: Dec. 3, 1998

(51) Int. Cl.$^7$ .................................................. G06F 9/44
(52) U.S. Cl. ............................................. 717/1; 706/47
(58) Field of Search ................................. 717/1; 706/47

(56) References Cited

U.S. PATENT DOCUMENTS

| 5,535,389 A | | 7/1996 | Elder et al. .................. 395/700 |
| 5,680,602 A | * | 10/1997 | Bloem et al. ................... 707/1 |
| 6,112,181 A | * | 8/2000 | Shear et al. ..................... 705/1 |

OTHER PUBLICATIONS

"Principles of Object–Oriented Analysis and Design" James Martin, PTR Prentice Hall Ch 1–22 & Appendix A Jun. 1, 1992.*

Using the SNAP Programming Language, Template Software, version 8.0 Chapter 6, 1997.*

* cited by examiner

Primary Examiner—Kakali Chaki
Assistant Examiner—Todd Ingberg
(74) Attorney, Agent, or Firm—Duke W. Yee; David A. Mims, Jr.; Stephen J. Walder, Jr.

(57) ABSTRACT

A method and apparatus for specifying, applying and managing rules used by an application in a data processing system are provided. A set of classification categories are specified, each classification category representing a different purpose of classification. A set of classifications are specified, each classification representing a possible outcome of an act of classifying. A set of control point names are specified, each name being associated with one or more control points in the application. A set of classification rules are specified, each such rule being associated with a classification category and said rule being adapted to analyze the state of the application and classify it by returning one or more classifications. A set of decision rules are specified, each such rule being associated with a classification and a control point name, said rule being adapted to affect the behavior of the application by calculating a value or making a decision. A set of control points is specified and built into the application at those points in the application flow at which variability of behavior controlled by rules is desired, each such control point being associated with a control point name and one or more classification categories. During the running of the application, when a control point as described above is encountered, the control point's associated classification categories are used to select that set of classification rules associated with any of the classification categories and the selected classification rules are then run.

38 Claims, 4 Drawing Sheets

METHOD AND DATA PROCESSING SYSTEM FOR SPECIFYING AND APPLYING RULES TO CLASSIFICATION-BASED DECISION POINTS IN AN APPLICATION SYSTEM

CROSS REFERENCE TO RELATED APPLICATION

The present invention is related to applications entitled Method And Apparatus For General Integrity Rule Checking Point In An Application, filed even date hereof, assigned to the same assignee; and Method And Apparatus For Applying Business Rules In An Object Model Driven Context, filed even date hereof, assigned to the same assignee; Managing Business Rules and Using Jurisdiction, Filed Aug. 14, 1998, application Ser. No. 09/134,341; and Method and Apparatus for Identifying Applicable Business Rules, Filed Dec. 18, 1997, application Ser. No. 09/993,718, both of which are signed to a common assignee and incorporated herein by reference.

BACKGROUND OF THE INVENTION

1. Technical Field

The present invention relates generally to an improved data processing system and in particular to an improved method and apparatus for managing a business system that relies on a large number of business rules. Still more particularly, the present invention relates to an improved method and apparatus for specifying and enforcing business rules in a business system.

2. Description of Related Art

Businesses use a wide variety of computer hardware and software products, for many different purposes. The hardware of a typical business information system includes a multitude of interconnected computers, printers, scanners, communications equipment, and other peripheral devices, allowing the business to automate much of the processing of its business information. The computers may be of different types, such as mainframes, minicomputers, or network servers supporting client workstations (personal computers, or PCs), or some combination of the foregoing. Business software includes (without limitation) accounting, word processing, database management, communications, publishing, and multimedia presentation software, as well as payroll, financial planning, project management, decision and support, personnel records, and office management software and further including specific business applications such as insurance claims and losses, credit approval, order entry and inventory, etc. All of these programs can run on a variety of platforms, including different operating systems. Businesses often have an Information Services or Information Technology (IT) department which is responsible for the overall management, support and planning of the company's information system needs.

One of the claims for object-oriented programming is that it makes it easier for software to model real-life business situation. The new vision of computing is of distributed Business Objects existing as independently developed executables or binaries, which can be redeployed as self-contained units anywhere in a network, and on any platform. While this represents a step forward, businesses are finding that encapsulating business logic into Business Objects provides insufficient additional flexibility over that provided by procedural-based applications.

Although the term Business Object has been in widespread use, no formal definition existed until the Object Management Group's (OMG) Business Object Management Special Group (BOMSIG) took the task of developing a consensus meaning for the term. Business Objects are representations of the nature and behavior of real world things or concepts in terms that are meaningful to the business. Customers, products, orders, employees, trades, financial instruments, shipping containers and vehicles are all examples of real-world concepts or things that could be represented by Business Objects. Business Objects add value over other representations by providing a way of managing complexity, giving a higher level perspective, and packaging the essential characteristics of business concepts more completely. We can think of Business Objects as actors, role-players, or surrogates for the real world things or concepts that they represent.

Implementing rules within Business Objects enables businesses to quickly change their automated policies and practices as business conditions change. For example, during the execution of an application, business rules can be used to decide whether to extend credit to a customer and if so under what terms. By implementing these determinations as externalized rules, they can be changed as needed without reworking the application that uses them.

Historically, developers creating business applications have embedded the rules of these applications directly in the applications themselves. Developers have built these systems without explicit regard for the changing nature of business rules. As a result, when business policies and practices change—and they're constantly changing—it's difficult, costly, and time consuming to reflect those changes in the applications that implement them.

More recently, developers have implemented business rules in database triggers. In response to database changes, database triggers are automatically invoked by a database server. The code in the triggers can execute some procedural logic as well as manipulate the database. Database triggers and stored procedures offer the advantage of modularity. They isolate business rules and technical data-manipulation rules from application logic. Triggers automate business rules processing and provide application independence (any application changing the database causes the triggers to be fired). However, triggers also have some serious disadvantages. They are hard to develop. They are intended to implement technical data-manipulation rules as well as business rules, and they are hard to maintain and extend particularly when they are used to implement business policies and practices.

Database triggers are frequently expressed in the dialect of the databases in which they're to be implemented. These languages are frequently proprietary and complex. Development is a text-editing task. There are few, if any, visual tools to assist developers in specifying trigger code.

Database triggers function on the elements and values of a database. Their specification is far more technically oriented then business oriented. Some triggers implement business rules, but many implement and enforce data integrity and data consistency. Applications builders who are using a trigger built by another developer might have difficulty deducing the business rules implemented by the trigger by looking at trigger code. Business analysts, the individuals who should be responsible for business rules specification, frequently find the triggers hard to learn and understand.

Database triggers are also hard to maintain. Developers may find it difficult to change triggers in response to business changes. Trigger development rarely fits into the overall flow of large-scale object-oriented application development. As a result, triggers tend to be hard to understand and relate to the application's business logic.

More recently, object-oriented business rules technologies have evolved which allow rules to route work through the tasks of a business process, where reasoning can be applied to complex decision-making, and where knowledge systems can perform operator assistance.

Object-oriented business rules technologies base rule processing on an application's object model or component model. Some products based on these technologies use inferencing techniques on an application's object model to create, delete, and manipulate variables and objects and to determine their values. Other products utilize a technique which always fires a rule before or after an object method. Both of these techniques are very programmer intensive, as they are built right into the objects themselves.

Business rules are different from Business Objects. Business Objects represent business entities like customers, products, and orders. They encapsulate the data and behavior needed to perform business functions. Business rules implement the policies and practices of an organization. They control the ways that Business Objects perform business functions. However, problems still exist for developers in specifying, identifying, and managing rules for an application.

One of the problems associated with specifying and applying rules to the decision points in an application system is that rule selection can be affected by the application's state at the time the decision point is encountered during execution of the application. Often different rules should be chosen to obtain the decision, based on the way things are classified by the business.

In light of the foregoing, it would be advantageous to have a method and apparatus for specifying and applying rules to classification-based decision points in an application system.

SUMMARY OF THE INVENTION

The present invention provides a method and apparatus for specifying, applying and managing rules used by an application in a data processing system. A set of one or more classification categories are specified, each classification category representing a different purpose of classification. A set of one or more classifications are specified, each classification representing a possible outcome of an act of classifying. A set of one or more control point names are specified, each name being associated with one or more control points in the application. A set of one or more classification rules are specified, each such rule being associated with a classification category and said rule being adapted to analyze the state of the application and classify it by returning one or more classifications. A set of one or more decision rules are specified, each such rule being associated with a classification and a control point name, said rule being adapted to affect the behavior of the application by calculating a value or making a decision. A set of one or more control points is specified and built into the application at those points in the application flow at which variability of behavior controlled by rules is desired, each such control point being associated with a control point name and one or more classification categories.

When, during the running of the application, a control point as described above is encountered, the control point's associated classification categories are used to select that set of classification rules associated with any of the classification categories. The selected classification rules are then run, and a set of classifications is obtained. Finally, the set of decision rules associated with the control point name and any of the set of classifications is selected. The set of selected decision rules is then run and the results combined into a single result in the usual way for control points.

Management of the set of rules is simplified by providing means for inspecting specified subsets of rules according to combinations of the control point name, classification categories, and classifications.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a method, apparatus, and instructions for specifying, applying and managing classification based business rules for a classification based control point in a data processing application. The present invention employs the use of control points representing decision or trigger points within the intrinsic behavior of a business object. These points are the points in the code of an object at which rules may be invoked. These rules may follow different patterns and are named.

The present invention provides a mechanism for identifying business rules based on classification in which a first phase occurs with the state of the application being assessed. The process of assessing a state of the application is called "classifying" it and is carried out by selecting and firing rules called classifier rules. The classifier rules selected for firing are those whose classification category matches one or more desired category. These categories are specified for and associated with control points and are used to group classifier rules which share a common purpose.

After being found, classifier rules are executed ("fired") to classify the current state of the system. If a classifier rule determines that the current state of the application is one that it recognizes, then the name of the classification is returned. If the application's state is not recognized by a classifier rule, nothing is returned. The relevant classifications are ordered by precedence and are used with the control point name to select the actual decision rules to fire. Depending on the type of control point, the decision rules can check some constraints or derive a value, such as a policy premium.

Thus, the present invention explicitly defines to a business user which rules are applied and when. In essence, rules are classified to correspond to varying business situations so that when looking for business rules that are relevant to a particular business decision, the right set of rules may be found.

The mechanism of the present invention is useful when the algorithm of use for the control point varies according to some set of criteria, which must be assessed prior to selecting the decision rules.

Figure 1:
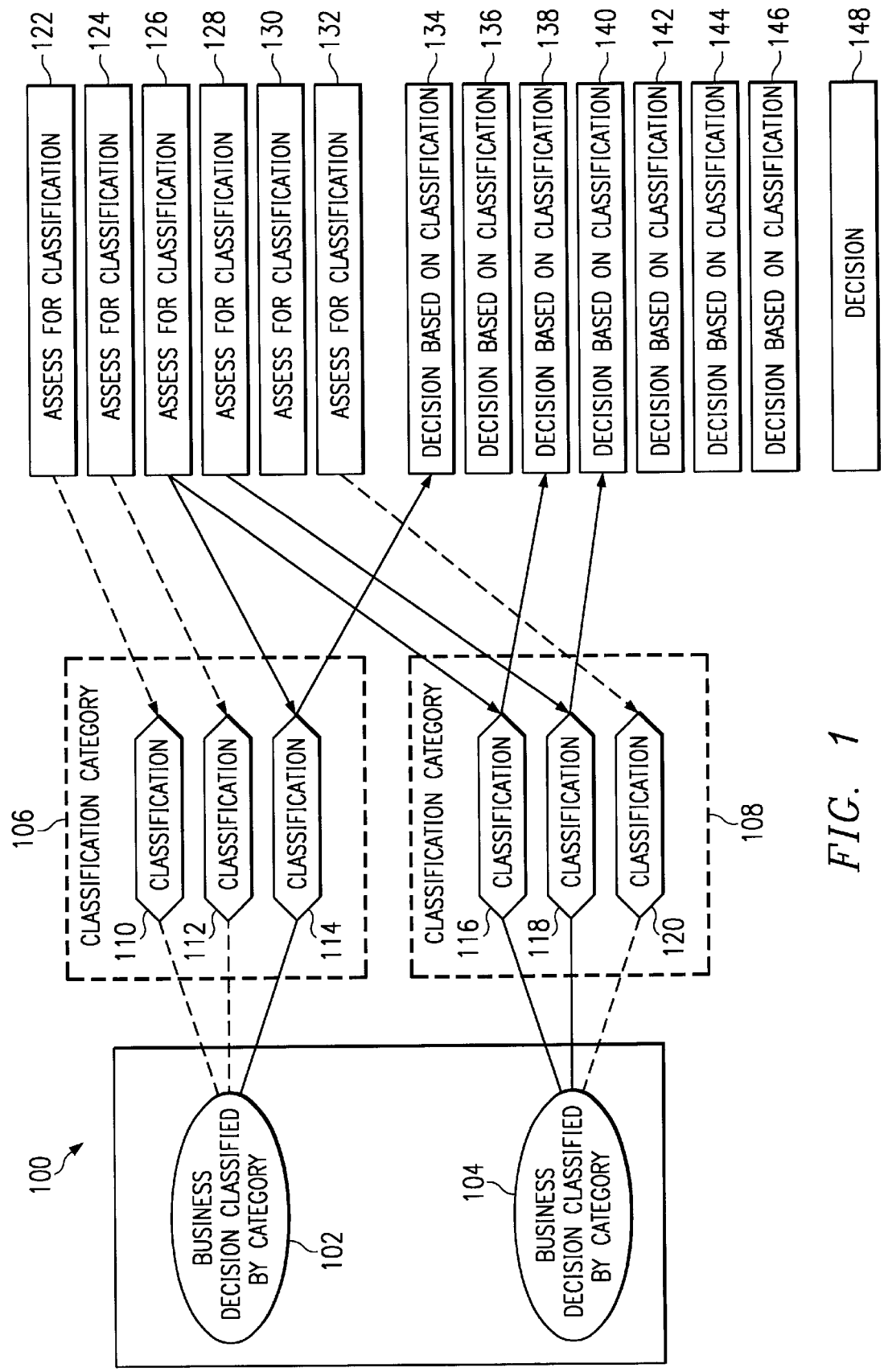
FIG. 1 is a diagram illustrating an application incorporating processes for specifying the control point and selecting rules in accordance with a preferred embodiment of the present invention.

With reference now to FIG. 1, a diagram illustrating an application incorporating processes for specifying control point rule selection variation and selecting rules is depicted in accordance with a preferred embodiment of the present invention. Application 100 includes control points 102 and 104. These control points are also referred to as decision points or trigger points. Control points encountered during execution of application logic and perform a number of standard functions. For example, these functions include locating rules, marshaling the parameters for the rules, firing the rules, interpreting the results of the rules, and consolidating to a single answer. The present invention employs a mechanism for locating decision rules and consolidating to a single answer. Locating decision rules is a two-step process in accordance with the preferred embodiment of the present invention. The first step involves assessing the state of the application by selecting and firing classifier rules to arrive at a set of classifications that describe the application's state in the specified way. This step is referred to as classifying the situation. The second step involves actually obtaining the decision rules that perform the trigger point function, but qualified only for those business situations that apply using the classifications from step 1. More information on control points may be found in the following applications: Managing Business Rules and Using Jurisdiction, Attorney Docket AT9-97-504, Filed Aug. 14, 1998, application Ser. No. 09/134,341; and Method and Apparatus for Identifying Applicable Business Rules, Attorney Docket At9-97-503, Filed Dec. 18, 1997, application Ser. No. 09/993,718, both of which are assigned to a common assignee and incorporated herein by reference. The type of control points in this invention classify the business situation according to one or more categories, prior to performing the usual work of the control point.

In the depicted example, both control points are qualified by independent classification categories. In this example, the classifications are placed into two categories, classification category 106 and classification category 108. Control point 102 is classified according to the rules associated with category 106 and control point 104 is classified according to the rules associated with category 108. Classification category 106 is used to locate the classifier rules for assessing for the particular category. In this example, classification category 106 has classifications 110, 112, and 114 associated with it. Classification category 108 has classifications 116, 118, and 120 associated with it. Based on the selected classification category, classifier rules are employed to assess the application state to determine if any of the classifications in the classification category apply. In the depicted example, rules 122–132 are present as classifier rules. Rules 122–126 are used to assess for classifications 110–114 in category 106; and rules 126, 128, and 132 are used to assess for classifications 116–120 in category 108. Based on the control point name and the applicable classifications, decision rules are selected so that a decision based on the classifications can be obtained. In the depicted example, decision rules 134–146 may be chosen depending on the classification and invoked to obtain the decision for the control point. For example, a control point 102 classified by classification category 106 would involve classifier rules 122, 124, and 126 to assess the applicability of classifications 110, 112, and 114. Classification 114 is the only applicable classification. The name of control point 102, qualified by the applicable classification 104 would locate decision rule 134 to obtain a decision for the control point. Also shown in FIG. 1 is an example where control point 104 is classified according to category 108 resulting in classifier rules 126, 128, and 132 being run to classify the application state, resulting in applicable classifications 116 and 118. These applicable classifications, combined with the name of control point 104, would result in decision rules 138 and 140 being found, executed, and results combined, to reach a decision for control point 104.

To show the two step selection of rules used in accordance with a preferred embodiment of the present invention. Two types of rules are present, classifier rules which are grouped into categories and are responsible for assessing the state of the application, and the rules that actually compute the decisions. The classifier rules are found based on their classification categories while the latter rules are found after the state of the application has been classified. The latter rules are qualified by the relevant classifications which reflect the assessed state of the application, at the time the business decision is to be made. In the depicted example, control point 102 has one applicable classification while control point 104 has two applicable classifications, classification 116 and classification 118.

Figure 2:
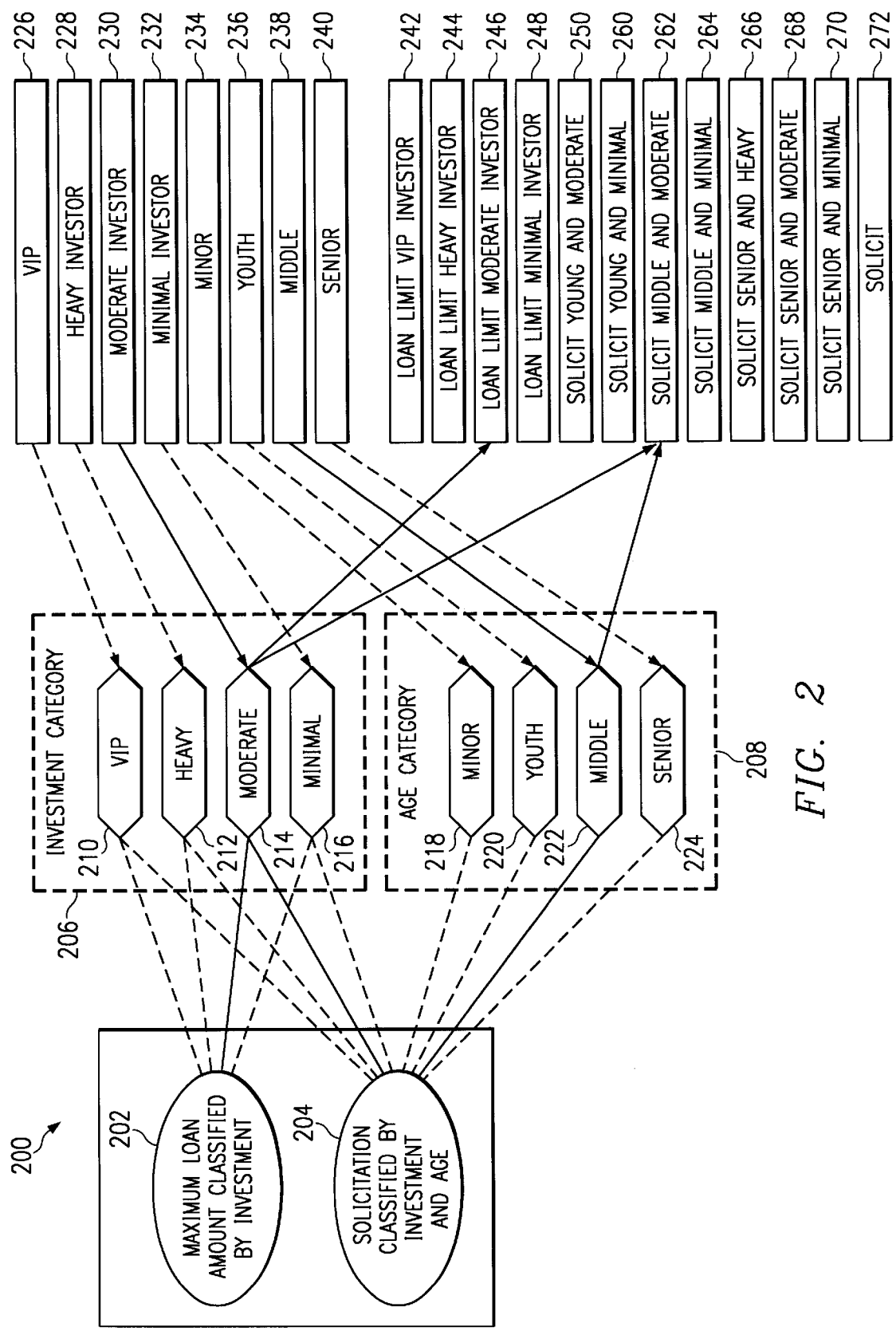
FIG. 2 is a diagram illustrating a specific example of an application incorporating specific types of control points, each of which assesses the application's state prior to selecting rules in accordance with a preferred embodiment of the present invention.

With reference now to FIG. 2, a diagram illustrating a specific example of an application incorporating a specific process in a banking context for selecting rules is depicted in accordance with a preferred embodiment of the present invention. Application 200 in the depicted example includes control points 202 and 204. Control point 202 is used to determine the maximum loan amount and is classified by investment level, while control point 204 is used for solicitation and is classified by investment level and age. In the depicted example, the classification categories investment 206 and age 208 are present. The investment category looks at the amount the individual has invested with the financial institution and classifies the investment level. The age category classifies an individual into an age group based on age.

Investment category 206 includes the classifications VIP 210, heavy 212, moderate 214, and minimal 216. Age category 208 includes minor 218, youth 220, middle 222, and senior 224 as the classifications that can be assessed and applied. In the depicted example, the following classifier rules are present to classify the state of the application: VIP 226, heavy investor 228, moderate investor 230, minimal investor 232, which are classifier rules used to classify the Investment Level; minor 234, youth 236, middle 238, and senior 240 which are classifier rules used to classify the age bracket.

Multiple categories can be identified by the control points to be used in classifying the business situation. In the depicted example, control point 202 has a single applicable classification category while control point 204 contains two classification categories, classifying the state of the application into both an investment level and in age.

Rules 242–248 compute the loan limit for the Maximum Loan Amount control point 202, depending on the investment level 206 of the applicant. In this example, only one classification applies to the specified investment level category, the Moderate Investor 214, as determined by classifier rule 230. Thus decision rule 246 is chosen to compute the maximum loan amount for this moderate investor. Likewise, rules 250–270 perform solicitation for the Solicitation control point 204, based on a compound classification found by classifying according to investment level 206 and age of the person 208. The Moderate Investor classification 214 and the Middle Age classification 222 are combined with the identity for the Solicitation control point 204 to obtain the Solicitation Rule for Middle Age individuals that are Moderate Investors 262. Had the applicable age classification been Minor, no decision rules would be found because there are no solicitation rules classified for minors, regardless of investment level.

Classifier rules such as those illustrated in FIGS. 1 and 2 are frequently reused by other classified control point contexts. For example, the same kind of classification of the business situation will frequently apply to a number of related business decisions. The present invention allows for different types of control point contexts to be affected by business classification. This may be applied to named contexts, jurisdictional contexts, and unit of work contexts.

Figure 3:
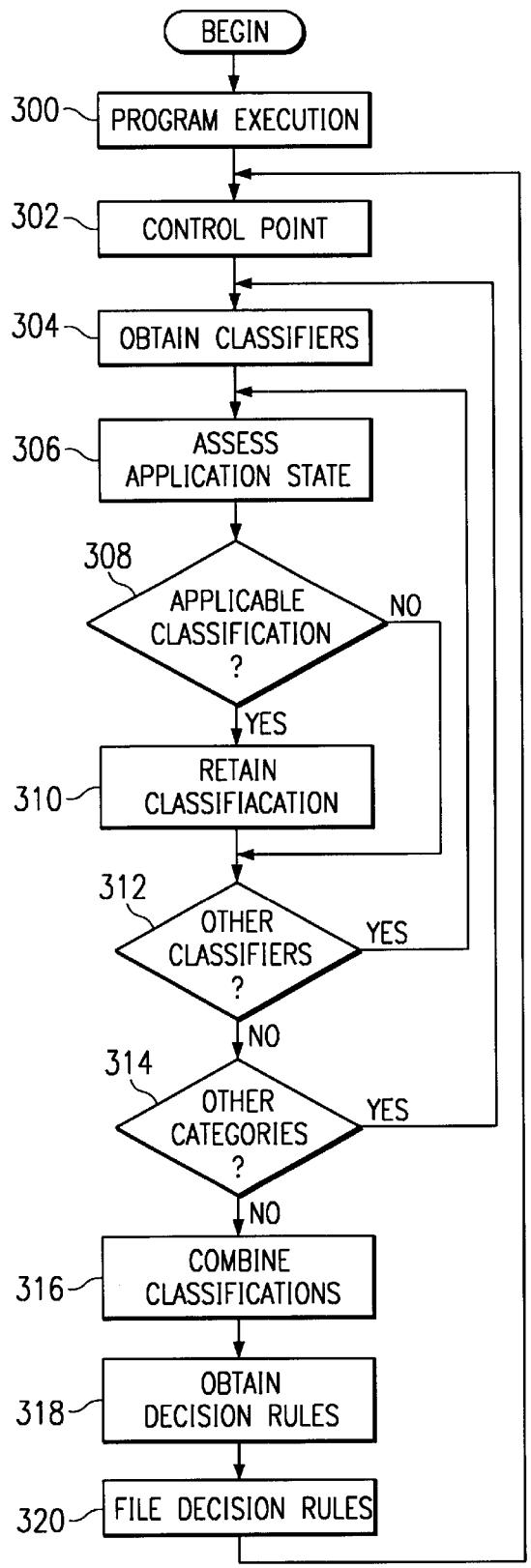
FIG. 3 is a flowchart of the process for a classification-based control point in accordance with the preferred embodiment of the present invention.

With reference now to FIG. 3, a flowchart of the process for a classification-based control point is depicted in accordance with the preferred embodiment of the present invention. The process begins with program execution (step 300) until a classification-based control point is encountered (step 302). Thereafter, a set of classifier rules applicable to the control point are obtained, based on the first of the set of classification categories associated with the control point (step 304). Next, the first of the classifier rules is fired. Each assesses the state of the application (step 306) and then decides whether the state is such that their classification is applicable (step 308). If it is, the classifier rule returns its associated classification (step 310). Otherwise the classifier rule returns nothing.

If there are additional classifier rules in this category (step 312), the next classifier rule is run, starting at step 306. Otherwise, a check is made to see if there are additional categories associated with this control point, and if so, the classifier rules for this category are obtained (step 304), beginning the classifier rule processing for this category.

Once the last category has been completely processed, the set of classifications returned by the classification rules is combined by a combining algorithm. Many such algorithms are possible. For example, the classifications may be sorted by a precedence associated with them and only those of the highest precedence used. Or they may be combined by concatenation or other means into compound classifications. Or they may all simply be used as is.

No matter what combining algorithm is used, the result is a set of zero or more classifications. These are used, along with the control point name, to select the decision rules (step 318) which are then fired (step 320), the results returned, and combined according to any of the usual ways for control points.

Figure 4:
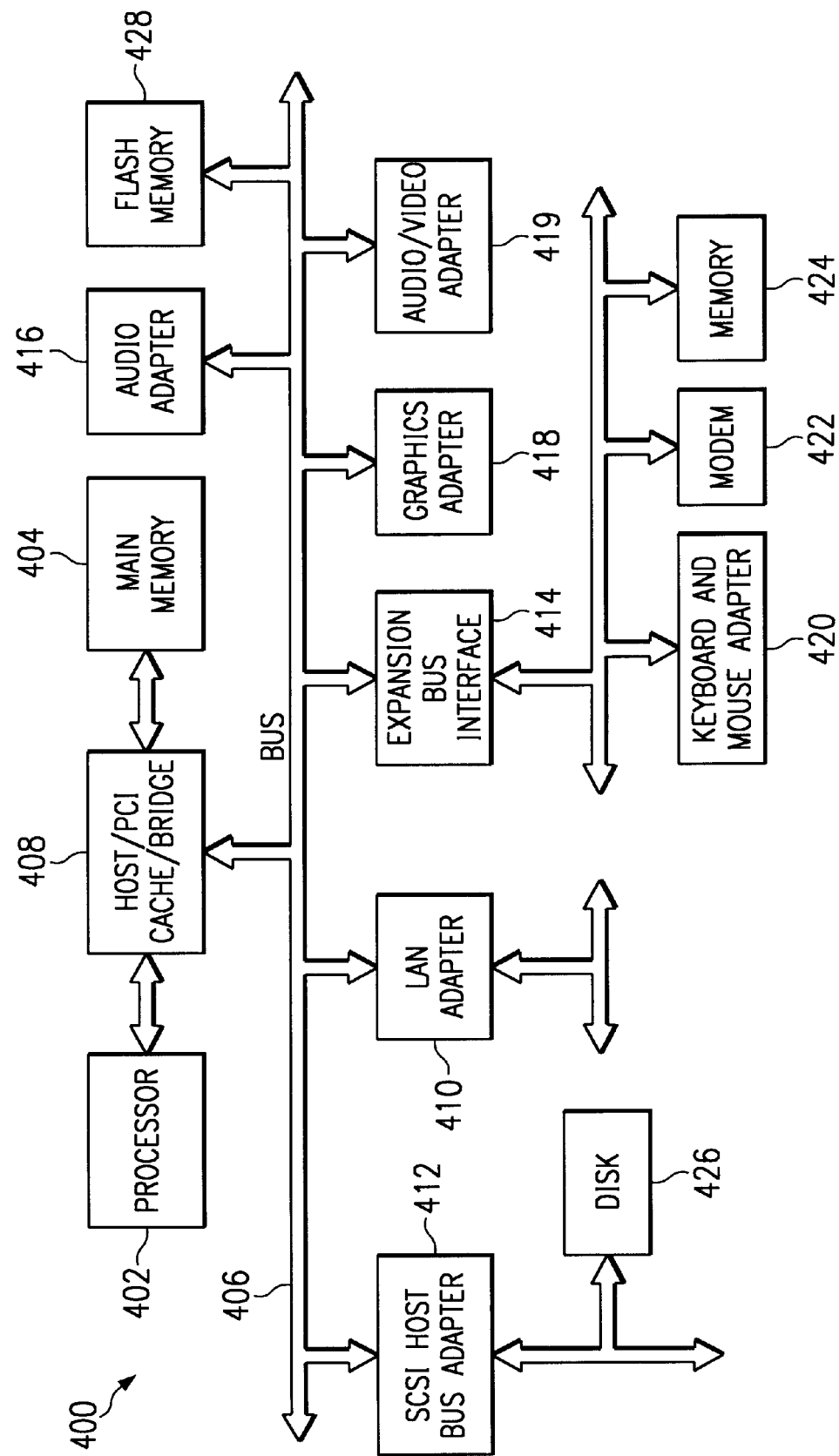
FIG. 4 is a block diagram of a data processing system in which the present invention may be implemented is illustrated.

With reference now to FIG. 4, a block diagram of a data processing system in which the present invention may be implemented is illustrated. Data processing system 400 is an example of a client computer. Data processing system 400 employs a peripheral component interconnect (PCI) local bus architecture. Although the depicted example employs a PCI bus, other bus architectures such as Micro Channel and ISA may be used. Processor 402 and main memory 404 are connected to PCI local bus 406 through PCI bridge 408. PCI bridge 408 also may include an integrated memory controller and cache memory for processor 402. Additional connections to PCI local bus 406 may be made through direct component interconnection or through add-in boards. In the depicted example, local area network (LAN) adapter 410, SCSI host bus adapter 412, and expansion bus interface 414 are connected to PCI local bus 406 by direct component connection. In contrast, audio adapter 416, graphics adapter 418, and audio/video adapter (A/V) 419 are connected to PCI local bus 406 by add-in boards inserted into expansion slots. Expansion bus interface 414 provides a connection for a keyboard and mouse adapter 420, modem 422, and additional memory 424. SCSI host bus adapter 412 provides a connection for hard disk drive 426, tape drive 428, CD-ROM drive 430, and digital video disc read only memory drive (DVD-ROM) 432 in the depicted example. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system such as OS/2, which is available from International Business Machines Corporation. "OS/2" is a trademark of from International Business Machines Corporation. An object oriented programming system such as Java may run in conjunction with the operating system and provides calls to the operating system from Java programs or applications executing on data processing system 400. Instructions for the operating system, the object-oriented operating system, and applications or programs are located on storage devices, such as hard disk drive 426 and may be loaded into main memory 404 for execution by processor 402.

Those of ordinary skill in the art will appreciate that the hardware in FIG. 4 may vary depending on the implementation. For example, other peripheral devices, such as optical disk drives and the like may be used in addition to or in place of the hardware depicted in FIG. 4. The depicted example is not meant to imply architectural limitations with respect to the present invention. For example, the processes of the present invention may be applied to multiprocessor data processing system and may be implemented for use in a network in a distributed manner.

It is important to note that while the present invention has been described in the context of a fully functioning data processing system, those of ordinary skill in the art will appreciate that the processes of the present invention are capable of being distributed in a form of a computer readable medium of instructions and a variety of forms, and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated

What is claimed is:

1. A method in a data processing system for specifying a control point in an application, the method comprising:

creating a control point in the application;

associating a classification category with the control point;

associating a plurality of classifier rules used to classify a state of the application with a category within a plurality of categories; and associating a plurality of decision rules with the control point, wherein the plurality of decision rules are applied based on an assessment of the state of the application according to the category within the plurality of categories.

2. A method in a data processing system for using rules in an application, the method comprising:

classifying, by a control point within the application, a state of the application based on a classification category within a plurality of classification categories to form a classified state of the application; and obtaining decision rules based on the classified state of the application in which the control point has been placed; and using the obtained decision rules to process a decision for the application.

3. The method of claim 2, wherein the step of classifying is performed using a set of classifier rules.

4. The method of claim 3, wherein the step of classifying includes:

returning a classification identifier when a classification applies for a classifier rule within the set of classifier rules assigned to a classification category.

5. The method of claim 4, wherein the classifier rules return nothing when the classification is inapplicable to the state of the application.

6. The method of claim 4, wherein at least zero classifications may apply to the state of the application.

7. The method of claim 6, wherein the at least zero classifications may be ordered by priority.

8. The method of claim 7, wherein a highest priority classification within the at least zero classifications may be chosen to affect a selection of decision rules.

9. The method of claim 6, wherein all applicable classifications may be combined to affect a selection of decision rules.

10. The method of claim 3, wherein the each of the classifier rules is assigned to a category within the plurality of categories.

11. The method of claim 3, wherein a classifier rule within the set of classifier rules associated with a classification category generates a classification when the state of the application is compatible with a classification for which the classification rule inspects.

12. A method in a data processing system for using rules, wherein the data processing system includes an application having an application state, the method comprising:

classifying the application state according to a classification category;

obtaining classifier rules applying to the classification category; and interpreting the classifier rules obtained to arrive at least one applicable classification of the application state.

13. The method of claim 12 further comprising:

consolidating interpretation of the classifier rules into a decision about the application state.

14. The method of claim 13, wherein steps of classifying, obtaining, interpreting, and consolidating occur in a control point in an application.

15. The method of claim 13, wherein a plurality of classifications are applicable to the application state and further comprising:

assigning a priority to each classification within the plurality of classifications; and selecting a classification within the plurality of classifications having a highest priority to represent a classification of the application state.

16. The method of claim 14, wherein a plurality of classifications are applicable to the application state and further comprising:

combining the plurality of classifications into a compound classification for the application state.

17. The method of claim 12, wherein the step of classifying is performed using a set of classifier rules chosen based on the classification category.

18. The method of claim 17, wherein the classification category is used to select at least one classifier rule from the set of classifier rules, wherein set of classifier rules are assigned to a classification category.

19. A method for using rules in an application having an application state in a data processing system, the method comprising:

classifying the application state of the application at a control point in the application, according to at least one classification category, using a first set of rules to generate a classification of the application state; and computing a decision at the control point, using a second set of rules, which are selected based on the classification of the application state and a name of the control point.

20. The method of claim 19 further comprising:

classifying the application state using a plurality of categories to form a compound classification at the control point;

identifying decision rules applicable to the compound classification; and generating a decision using the decision rules identified as applicable to the compound classification.

21. The method of claim 19, wherein the application is a business application and wherein the rules applicable to the plurality of categories are business rules.

22. The method of claim 19, wherein the application is an object-oriented application.

23. A method in a data processing system for using a plurality of business rules in an object oriented application, the method comprising:

creating a control point within the object oriented application; and classifying a state of the application of the object oriented application based on at least one classification category; and selecting a business rule from the plurality of business rules based on the classification of the state of object oriented application and a name of the control point.

24. The method of claim 23, further comprising:

executing the business rule to obtain a business decision.

25. An application for use in a data processing system, wherein the application has a state, the application comprising:

an object; and a control point located within the object, wherein the control point is activated upon execution of the object to make a decision, wherein the control point classifies the state of the application into a classification using classifier rules, obtains decision making rules based on the classification of the situation, and computes a decision according to the decision making rules.

26. The application of claim 25, wherein the decision making rules also are obtained based on a name of the control point.

27. The application of claim 25, wherein the application is a business application.

28. The application of claim 25, wherein the classifier rules are grouped into categories for classifying the state of the application.

29. The application of claim 25, wherein the control point classifies the state of the application into a compound classification using the classifier rules associated with a plurality of categories, obtains decision making rules based on the compound classification, and generates a decision according to the decision making rules.

30. The application of claim 25, wherein the decision making rules obtained by the control point include at least one decision making rule.

31. A data processing system for using rules, wherein the data processing system includes an application having an application state, the data processing system comprising:

classifying means for classifying the application state according to a classification category;

obtaining means for obtaining classifier rules applying to the classification category; and interpreting means for interpreting the classifier rules obtained to arrive at least one applicable classification of the application state.

32. The data processing system of claim 31 further comprising:

consolidating means for consolidating interpretation of the classifier rules into a decision about the state.

33. A data processing system for using rules in an application having an application state in a data processing system, the data processing system comprising:

classifying means for classifying the application state of the application at a control point in the application, according to at least one classification category, using a first set of rules to generate a classification of the application state; and computing means for computing a decision at the control point, using a second set of rules, which are selected based on the classification of the application state and a name of the control point.

34. The data processing system of claim 33 further comprising:

classifying means for classifying the application state using a plurality of categories to form a compound classification at the control point;

identifying means for identifying rules applicable to the compound classification; and generating means for generating a decision using the rules identified as applicable to the compound classification.

35. A data processing system for using a plurality of business rules in an object oriented application, the data processing system comprising:

creating means for creating a control point object within the object oriented application;

classifying means for classifying a state of the application of the object oriented application based on at least one classification category; and selecting means for selecting a business rule from the plurality of business rules based on the classification of the state of object oriented application.

36. A computer program product in a data processing system for using rules, wherein the data processing system includes an application having an application state, the computer program product comprising:

a computer readable medium;

first instructions for classifying the application state according to a classification category;

second instructions for obtaining classifier rules applying to the classification category; and third instructions for interpreting the classifier rules obtained to arrive at least one applicable classification of the application state.

37. A computer program product for managing rules used by an application in a data processing system, the computer program product comprising:

a computer readable medium;

first instructions for classifying the application state for the application at a control point in the application, according to at least one classification category, using a first set of rules to generate a classification of the application state; and second instructions for computing a decision at the control point, using a second set of rules, which are chosen based on the classification of the application state wherein the instructions are embodied in the computer readable medium.

38. A computer program product in a data processing system for managing a plurality of business rules in an object oriented application, the computer program product comprising:

a computer readable medium;

first instructions for creating a control point object within the object oriented application; and second instructions for classifying a state of the object oriented application based on at least one classification category; and third instructions for selecting a business rule from the plurality of business rules based on the classification of the state of the object oriented application wherein the instructions are embodied in the computer readable medium.

* * * * *